United States Patent [19]
Cho et al.

[11] Patent Number: 5,613,745
[45] Date of Patent: Mar. 25, 1997

[54] AUXILIARY COMPACT DISK STORAGE CASE

[75] Inventors: Chan-Kyoung Cho, Seoul; Seung-Hyuk Shin, Kyonggi-do, both of Rep. of Korea

[73] Assignee: Hyundai Electronics Industries Co., Ltd., Rep. of Korea

[21] Appl. No.: 393,118

[22] Filed: Feb. 21, 1995

[30] Foreign Application Priority Data

Feb. 18, 1994 [KR] Rep. of Korea .................. 94-2860

[51] Int. Cl.[6] ............. B65G 65/23; B65D 85/57; A47B 81/06
[52] U.S. Cl. .......... 312/9.9; 206/308.1; 369/192; 414/937; 312/9.1
[58] Field of Search ............ 312/9.11, 9.9, 312/9.29, 9.3, 193.4, 9.33, 9.2, 9.4, 9.12–9.15, 9.38, 9.45, 9.52, 9.58, 9.59, 59, 72; 211/40, 307.1, 308.1, 309; 364/36, 192, 193; 414/277, 280, 417, 937, 932

[56] References Cited

U.S. PATENT DOCUMENTS

| | | | |
|---|---|---|---|
| 4,614,474 | 9/1986 | Sudo | 369/192 X |
| 4,664,454 | 5/1987 | Schattemam et al. | 206/308.1 X |
| 4,695,103 | 9/1987 | MacDonald et al. | 312/9.33 |
| 4,774,715 | 5/1988 | Kawabata | 414/937 X |
| 5,033,038 | 7/1991 | Kobayashi et al. | 369/36 |
| 5,183,370 | 2/1993 | Cruz | 414/937 X |
| 5,191,977 | 3/1993 | Markovitz | 206/308.1 |
| 5,193,969 | 3/1993 | Rush et al. | 414/417 X |
| 5,217,340 | 6/1993 | Harada et al. | 414/937 X |
| 5,232,275 | 8/1993 | Yamazoe | 312/9.58 |
| 5,267,225 | 11/1993 | Fukasawa et al. | 369/192 X |
| 5,331,614 | 7/1994 | Ogawa et al. | 369/36 X |

*Primary Examiner*—Peter M. Cuomo
*Assistant Examiner*—Robert J. Sandy
*Attorney, Agent, or Firm*—David M. Klein; Bryan Cave LLP

[57] ABSTRACT

An auxiliary compact disc storage case includes a housing knowing opposed ledges for receiving a plurality of compact discs one above the other. Two opposed sides of the housing are open and pivotally mounted in one of the openings is a pushing plate. The housing carries hinge members arranged to connect it to complementary formations on a compact disc storage magazine. The pushing plate may be rotated into contact with all the compact discs within the housing and thus pushes all of them out of the housing simultaneously into the storage compartments of a compact disc storage magazine forming part of a compact disc auto changer.

22 Claims, 4 Drawing Sheets

AUXILIARY COMPACT DISK STORAGE CASE

BACKGROUND OF THE INVENTION

This invention relates to an auxiliary compact disc storage case which can be used as a disc transporting case and as a storage magazine of a compact disc auto changer. The invention further relates to a compact disc auto changer in combination with such an auxiliary disc storage case.

FIG. 1 is a perspective view of a compact disc auto changer with which the auxiliary compact disc storage case in accordance with the invention may be used.

A housing 1 houses two vertical rows or stacks of disc storage magazines 2 which accommodate compact discs 10.

Below the magazine stacks are disposed playback units 3 and 3'. A carrier member 4 is located between the two stacks of the magazines and is vertically displaceable to allow compact discs to be carried between the playback units 3, 3' and the discs storage magazines 2.

In general, each stack of the magazines 2 includes four magazines preferably and each magazine holds forty five compact discs.

In this CD auto changer, the vertically displaceable carrier member moves vertically between the magazines and the playback units to take compact discs out of the magazines, or to insert the discs into the magazines.

In general, compact discs used in the CD auto changer are packaged individually by the manufacturer, and subsequently inserted into the CD auto changer manually by a user. This manual insertion may take up to 3 hours if all 360 magazine locations are to be filled. Should the CD auto changer break down, removing and replacing the CDs may well be more time consuming than the repair itself. A further significant cost to the manufacturer arises from the requirement that the CD's be individually packaged.

SUMMARY OF THE INVENTION

An object of the present invention is to provide an auxiliary disc storage case which can be used as a disc transporting case and as an auxiliary case for storing compact discs in the disc storage magazines of a compact disc auto changer.

Another object of the present invention is to provide an auxiliary compact disc case which prevents damage to the recording face of the compact disc because manual intervention by the user is avoided.

Still another object of the present invention is to provide an auxiliary compact disc case which facilitates the insertion of compact disc into the magazines of a CD auto changer.

According to the present invention there is provided an auxiliary compact disc storage case comprising a housing; means within the housing for accommodating a plurality of compact disc adjacent one another, pushing means arranged to engage the plurality of compact discs; and means for connecting the housing to a compact disc storage magazine, the pushing means being arranged to urge the plurality of compact discs from the housing substantially simultaneously.

Thus the auxiliary compact disc case may be used not only for storing compact discs but may also be connected to a compact disc storage magazine, which may form part of a compact disc auto changer, and the pushing means may then be actuated to push all the compact discs within the disc case simultaneously into the storage compartments defined by the magazine. Thus the use of the storage case of the present invention eliminates the necessity of placing a large number of compact discs into a storage magazine individually and instead enables a large number of discs to be inserted simultaneously.

The pushing means may take many forms but in the preferred embodiment of the invention is pivotally attached to the housing by cooperating hinge means on the housing and the pushing means. It is preferred that the housing is cuboidal and the hinge means on the housing is connected to two opposed surfaces of the housing which are perpendicular to the surface in which the opening is formed. The pushing means is preferably pivotally attached to the housing by two hook-shaped members cooperating with respective pivot pins and the hook-shaped members preferably define an open part-circular recess thereby permitting the pushing means to be moved laterally with respect to the pivot pins to engage the latter with the hook-shaped members thereby pivotally connecting the pushing means to the housing.

The housing will of course necessarily be at least partially open on one side, during use, to permit the compact discs to be ejected from the housing. It is preferred that the housing also have an opening on the opposite side through which the disc-pushing portion moves, when actuated. In order to avoid the risk of a compact disc inadvertently falling out through this opening it is preferred that means is provided which prevents this from occurring. This means may constitute a support plate or the like having at least one opening through which the disc-pushing portion may pass.

The connecting means may include at least one first hinge means on one side of the housing adapted to pivotally connect the housing to a compact disc storage magazine. The connecting means may also include first locking means on the other side of the housing adapted to lock the housing against a compact disc storage magazine.

The present invention is also an auxiliary compact disc storage case of the type referred to above in combination with a compact disc auto changer. In this embodiment, each compact disc storage magazine preferably includes at least one second hinge means adapted to form a hinge connection with a respective first hinge means. It is preferred that the first hinge means comprises a hook-shaped member with a part-circular portion and the or each second hinge means comprises a groove or recess with a part-circular portion pivotally receiving the part-circular portion of a respective hook-shaped member. This construction of the hinge means permits the pivotal connection of the auxiliary storage case and the compact disc storage magazine to be produced merely by moving one of these elements relative to the other such that the part-circular portion of the hook-shaped member enters the associated groove or recess and is then received in the part-circular portion of that groove or recess, the complementary part-circular portions constituting a rotatable but readily separable hinge connection.

BRIEF DESCRIPTION OF THE DRAWINGS

The present invention will now be described by way of example with reference to the accompanying drawings, in which.

DETAILED DESCRIPTION OF THE INVENTION

Figure 1:
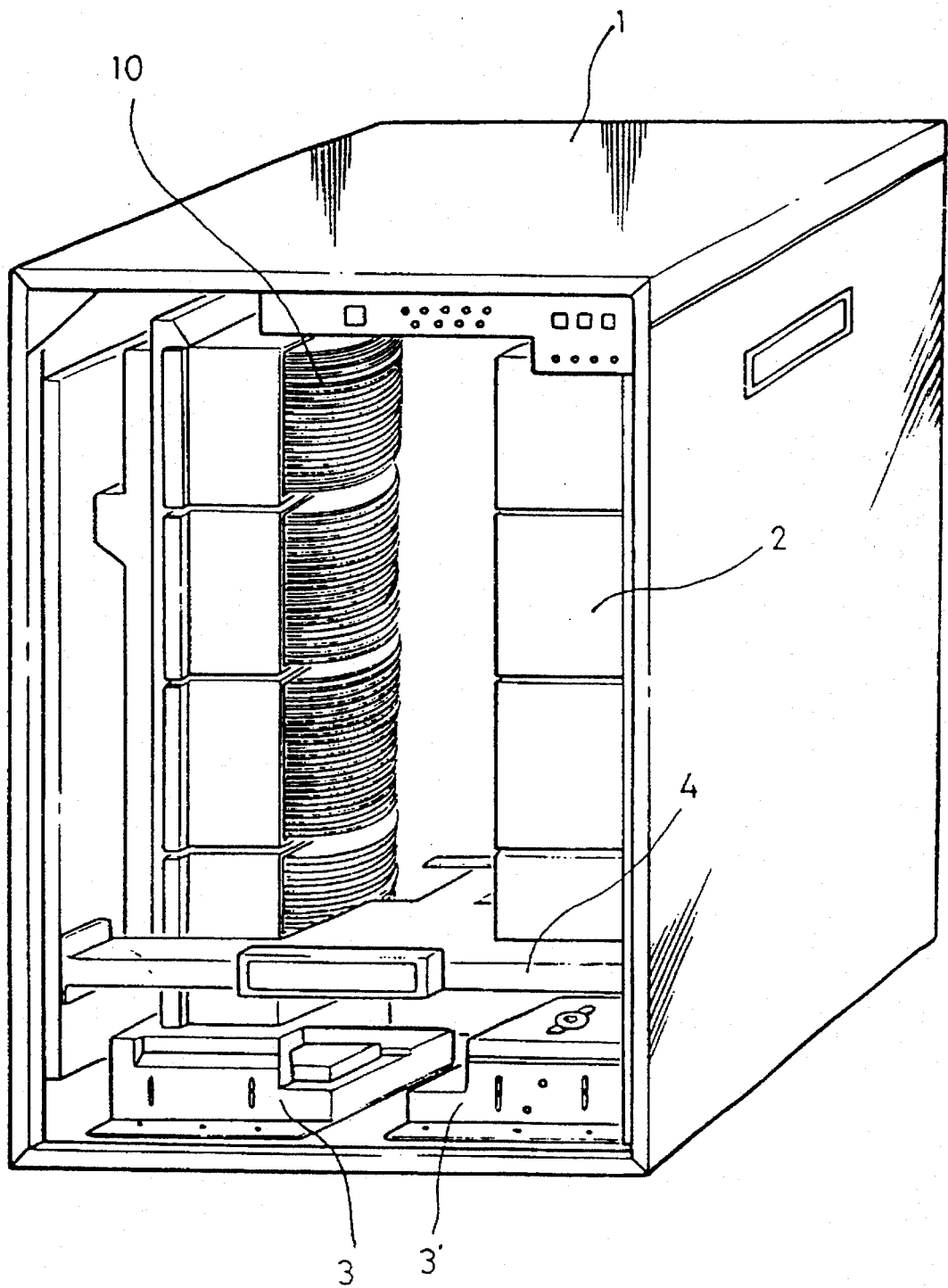
FIG. 1 is a perspective view of a compact disc auto changer with which the auxiliary compact disc storage case of the present inventions may be utilized.
Figure 2A:
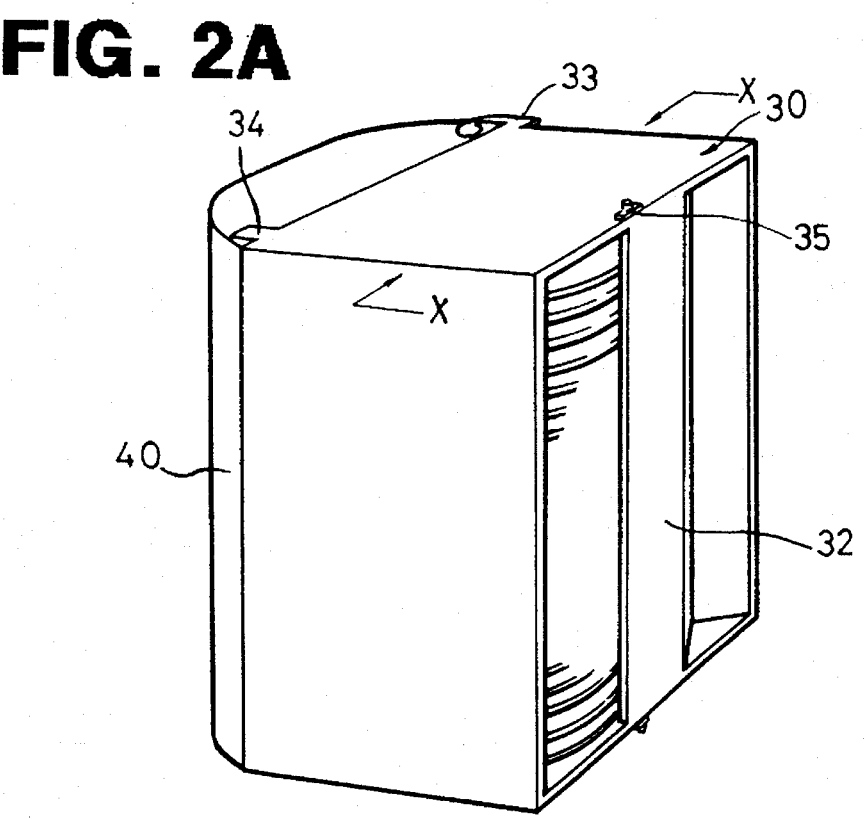
FIG. 2A is a perspective view of the auxiliary compact disc storage case of the present invention having a cover attached to it.

An auxiliary compact disc storage case 30 of the present invention suitable for assembly with compact disc storage magazines 2 is shown in FIG. 2A. The auxiliary compact disc storage case 30 is substantially cuboidal and has an opening on one side which, when packaged, is covered by a cover 40, and is substantially open on the other or pushing side.

Attached to the case 30 in the opening on the pushing side is a support plate 32 to prevent compact discs from falling out.

Figure 2B:
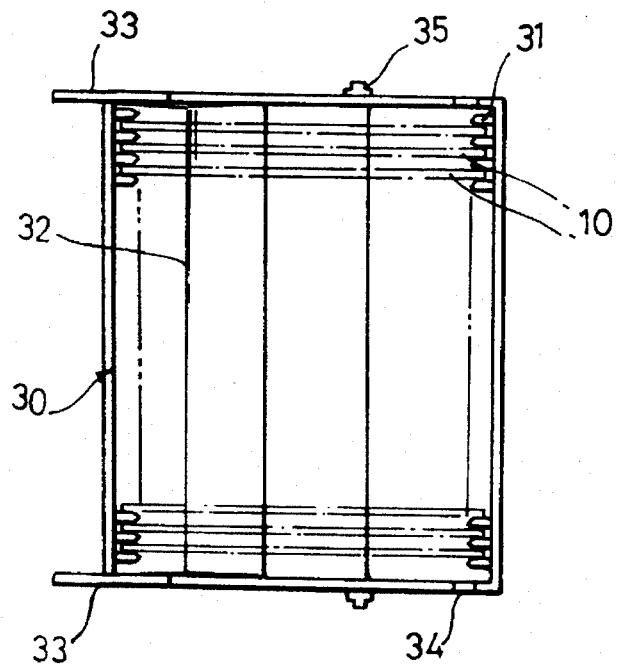
FIG. 2B is a cross-section along line X—X of FIG. 2A.

As shown in FIG. 2B, a plurality of vertically spaced disc holding extensions or ledges 31 protrude from the opposite inner walls of the auxiliary compact disc storage case 30 and define spaces for holding and storing respective compact discs. The disc holding extensions 31 have curved faces for contact with the compact discs and facilitate smooth insertion of the compact discs into the case 30.

Figure 3A:
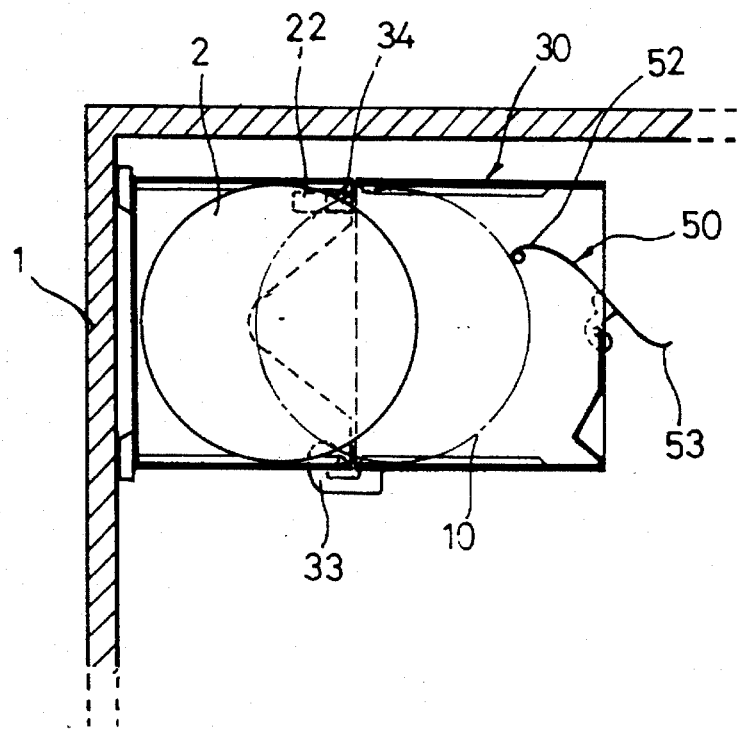
FIG. 3A is a plan view of the auxiliary compact disc storage case and pushing plate connected to a compact disc auto changer magazine.
Figure 3B:
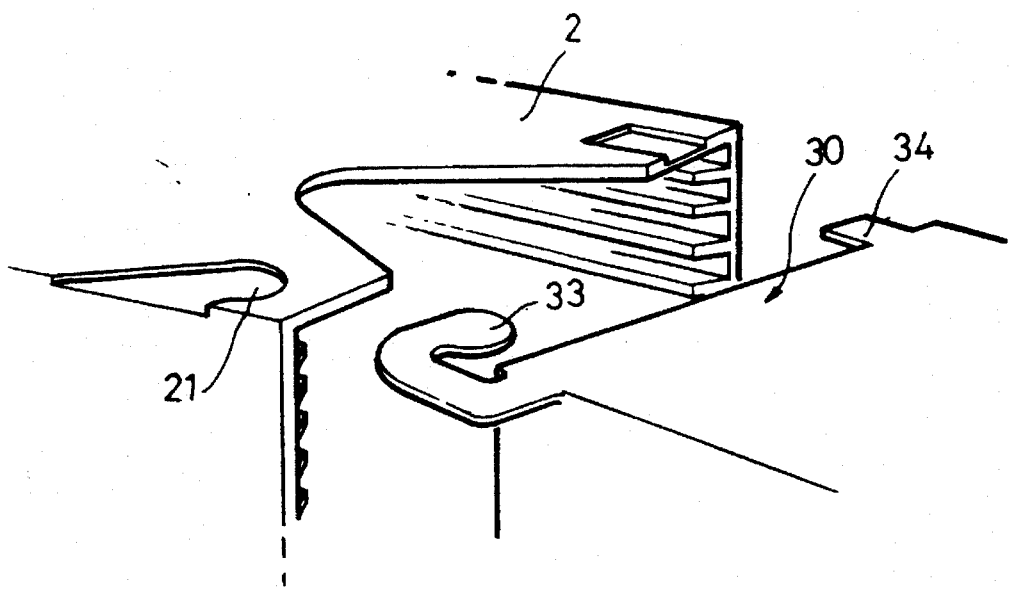
FIG. 3B is a perspective view of the auxiliary compact disc storage case and shows the manner in which it is connected to a compact disc auto changer magazine.

As shown in FIG. 3B, the compact disc storage magazines 2 each have an open sided groove or recess 21 on one side of the upper and lower external surfaces. Each groove 21 is of generally elongate form and terminates in a particular portions at an end which, in use, is closest to the auxiliary storage case 30. Complementary hook-shaped pivotal or hinge members 33 project from one side of the upper and lower surfaces of the storage case 30. These each terminate in a part-circular portion matching that at the end of the grooves 21.

Locking recesses 22 are formed on the upper and lower surfaces of the magazines 2, on the opposite side of the magazines from the groove. Complementary aligned locking protrusions 34 to engage the locking recesses 22 extend from the upper and lower edges of the auxiliary compact disc storage case 30.

As shown in FIG. 3A, the pivotal hook members 33 on the auxiliary compact disc case 30 are inserted into the grooves 21. of the magazine 2. The complementary part-circular portions are brought into engagement and act as a hinge when the case 30 is rotated about the hinge connection, the locking protrusions 34 engage the locking grooves 22, thus holding the auxiliary compact disc case 30 in place against the magazine 2.

Figure 4A:
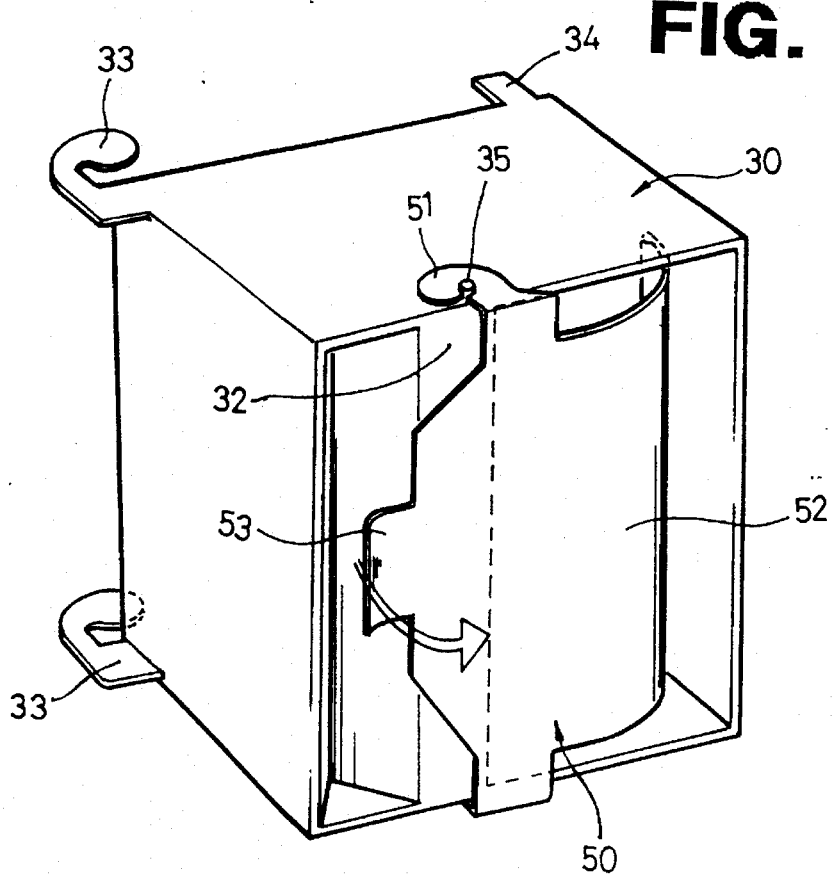
FIG. 4A is a perspective view of an auxiliary compact disc storage case to which the a pushing plate has been connected.

FIG. 4A is a perspective view of the auxiliary compact disc storage case 30 to which a pushing plate 50 has been attached. The plate 50 is arranged to enter the auxiliary compact disc case 30 through the opening on the pushing side. The plate 50 has a curved disc-pushing portion 52 and a handle portion 53 opposite thereto. The plate 50, is approximately "S"-shaped in section.

The plate 50 is pivotally attached to the auxiliary compact disc storage case 30 by means of two pivot pins 35 projecting from the upper and lower surfaces, of the case 30 at the mid-point of the edge of the opening on the pushing side. The pivot pins engage with corresponding hook portions 51 on the plate 50. The hook portions 51 define an open part-circular recess or opening which accommodates the associated pivot pins 35 thereby pivotally connecting the pushing plate 50 to the housing of the case 30 in a readily separable manner. To decrease the friction between the compact discs and the curved disc-pushing portion 52, a layer of low friction material is applied to the curved disc-pushing surface of the portion 52.

In use, the cover 40 (shown in FIG. 2A) is removed from the auxiliary compact disc case 30. Each pivotal hook member 33 on the auxiliary compact disc case 30 (the upper of which is shown in FIG. 3B) is then inserted into the associated groove 21 in the magazine 2.

The locking protrusions 34 of the case 30 are then urged into engagement with the locking recesses 20 of the magazine 2.

Figure 4B:
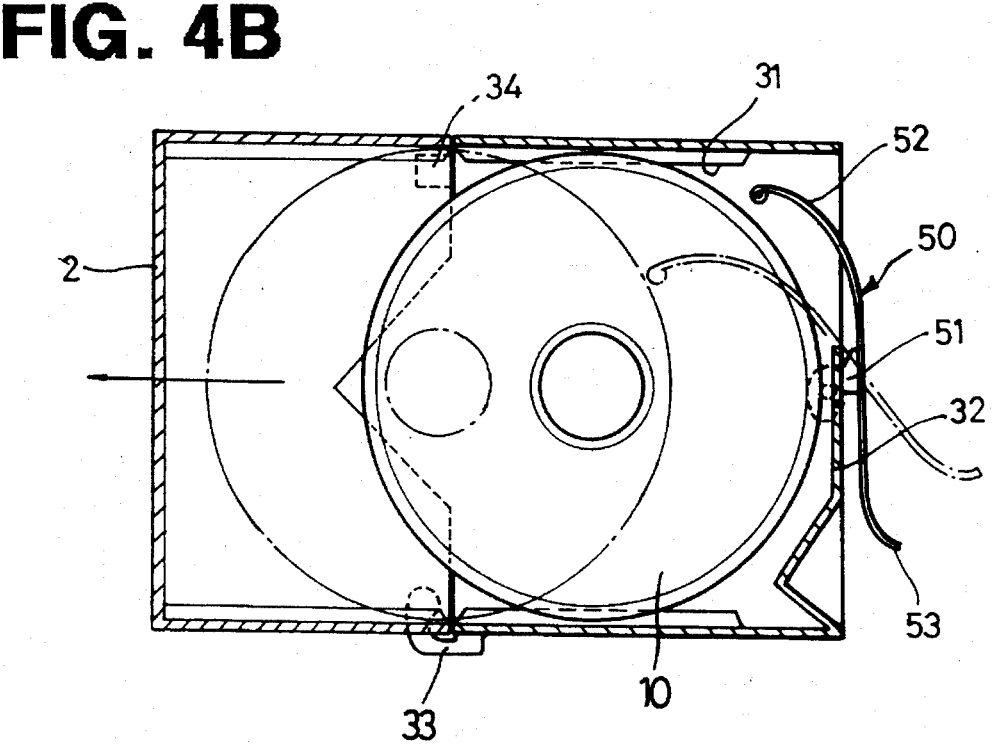
FIG. 4B is a plan view of showing the operation the pushing plate of the present invention.

As shown in FIG. 4A, the handle portion 53 of the plate 50 is pulled in the direction of the arrow. Upon pulling of the handle portion 53, as shown in FIG. 4B, the curved disc-pushing portion 52 enters the opening of the auxiliary compact disc case 30, thereby engaging all the compact discs therein and pushing them into the magazines 2 at the same time.

Accordingly, the auxiliary compact disc case 30 of the present invention allows many compact discs to be inserted into the disc storage magazine 2 simultaneously, saving a substantial amount of time. Furthermore, the auxiliary compact disc case 30 of the present invention prevents damage to the recording face or compact discs 10 because manual intervention by the user is avoided.

While particular embodiments of the present invention have been shown and described, it will be obvious to those skilled in the art that changes and modifications may be made without departing from the invention in its broader aspects.

What is claimed is:

1. An auxiliary compact disc storage case comprising:

a housing;

storage means within the housing for accommodating a plurality of compact discs adjacent one another;

pushing means pivotally mounted to the housing, the pushing means arranged to engage the plurality of compact discs and to push the plurality of compact discs from the housing substantially simultaneously; and means for mounting the housing to a compact disc storage magazine.

2. The auxiliary compact disc storage case in accordance with claim 1, wherein the pushing means is pivotally attached to the housing by cooperating hinge means on the housing and the pushing means.

3. The auxiliary compact disc storage case in accordance with claim 2, wherein the housing is cuboidal and the hinge means on the housing is disposed on opposed surfaces of the housing which are perpendicular to a surface of the housing in which an opening is formed for insertion and removal of the compact discs.

4. The auxiliary compact disc storage case in accordance with claim 2, wherein the pushing means is pivotally attached to the housing by two hook-shaped members co-operating with respective pivot pins.

5. The auxiliary compact disc storage case in accordance with claim 1, wherein the pushing means comprises a handle portion and a curved disc-pushing portion.

6. The auxiliary compact disc storage case in accordance with claim 5, wherein the handle portion is curved in the opposite direction to the disc-pushing portion, so that the pushing means is substantially "S"-shaped.

7. The auxiliary compact disc storage case in accordance with claim 5, wherein the curved disc-pushing portion comprises a layer of low friction material disposed thereon.

8. The auxiliary compact disc storage case in accordance with claim 5 wherein the housing comprises an opening through which the disc-pushing portion moves, when actuated, and further comprising a support plate having at least one opening through which the disc-pushing portion extends, the support plate being arranged to prevent compact discs from falling out of the housing.

9. The auxiliary compact disc storage case in accordance with claim 1 wherein the connecting means comprises at least one first hinge means on one side of the housing adapted to pivotally connect the housing to a compact disc storage magazine.

10. The auxiliary compact disc storage case in accordance with claim 9 wherein the connecting means comprises first locking means on the other side of the housing adapted to lock the housing against a compact disc storage magazine.

11. The auxiliary compact disc storage case in accordance with claim 9, in combination with a compact disc auto changer, the auto changer comprising a plurality of magazines each comprising a top, a bottom and side walls and defining a plurality of compartments for accommodating respective compact discs.

12. The auxiliary compact disc storage case in accordance with claim 11, the auto changer comprising a plurality of magazines arranged in two vertical stacks on opposed interior sides of the auto changer.

13. The auxiliary compact disc storage case in accordance with claim 12, the auto changer further comprising at least one playback unit disposed below the magazines, and a disc carriage member movable vertically between the stacks of magazines and the playback unit(s).

14. The auxiliary compact disc storage case in accordance with claim 11, wherein each compact disc storage magazine comprises at least one second hinge means adapted to form a hinge connection with a respective first hinge means.

15. The auxiliary compact disc storage case in accordance with claim 14, wherein the first hinge means comprises a hook-shaped member with a part-circular portion and the second hinge means comprises a groove or recess with a part-circular portion pivotally receiving the part-circular portion of a respective hook-shaped member.

16. The auxiliary compact disc storage case in accordance with claim 15 comprising one groove formed in the top of each magazine and one groove formed in the bottom thereof, the housing comprising one hook-shaped member at the top thereof and one hook-shaped member at the bottom thereof.

17. The auxiliary compact disc storage case in accordance with claim 10 in combination with a compact disc auto changer, the auto changer comprising a plurality of magazines each comprising a top, a bottom and side walls and a plurality of compartments for accommodating respective compact discs.

18. The auxiliary compact disc storage case in accordance with claim 17, wherein the first and second locking means comprise a locking protrusion and a locking recess, respectively.

19. The auxiliary compact disc storage case in accordance with claim 18 comprising two locking protrusions, wherein the locking recesses are at the top and bottom of the housing and each magazine respectively.

20. The auxiliary compact disc storage case in accordance with claim 18, wherein the locking recess is disposed adjacent that side wall of the magazine opposite to the side wall adjacent which the second hinge means is disposed.

21. The auxiliary compact disc storage case in accordance with claim 1 in combination with a compact disc auto changer, the auto changer comprising a plurality of magazines each comprising a top, a bottom and side walls and a plurality of compartments for accommodating respective compact discs.

22. The auxiliary compact disc storage case in accordance with claim 17 further comprising second locking means on each magazine arranged to cooperate with the first locking means on the housing.

* * * * *